(12) United States Patent
Mannerheim

(10) Patent No.: US 6,282,912 B1
(45) Date of Patent: Sep. 4, 2001

(54) AIR CONDITIONER UNIT FOR MOUNTING WITHIN OR ON THE ROOF OF A VEHICLE

(76) Inventor: Gunnar Mannerheim, 80 Kincourt Street, North York, Ontario (CA), M6M 5G1

( * ) Notice: Subject to any disclaimer, the term of this patent is extended or adjusted under 35 U.S.C. 154(b) by 0 days.

(21) Appl. No.: 09/486,742
(22) PCT Filed: Sep. 15, 1998
(86) PCT No.: PCT/CA98/00858
§ 371 Date: Mar. 2, 2000
§ 102(e) Date: Mar. 2, 2000
(87) PCT Pub. No.: WO99/14066
PCT Pub. Date: Mar. 25, 1999

(30) Foreign Application Priority Data

Sep. 15, 1997 (CA) .................................................. 2215458

(51) Int. Cl.[7] ...................................................... B60H 1/32
(52) U.S. Cl. ...................... 62/244; 62/259.1; 62/DIG. 16
(58) Field of Search .................................. 62/244, 259.1, 62/239, DIG. 16

(56) References Cited

U.S. PATENT DOCUMENTS

| | | | |
|---|---|---|---|
| 3,848,428 | * | 11/1974 | Rieter, Jr. ............................ 62/244 X |
| 3,973,620 | * | 8/1976 | Stringer ............................... 62/244 X |
| 4,051,691 | * | 10/1977 | Dawkins .............................. 62/244 X |
| 4,201,064 | * | 5/1980 | Krug et al. .......................... 62/244 X |
| 4,592,207 | * | 6/1986 | Rummel .................................. 62/244 |
| 4,926,655 | * | 5/1990 | King ..................................... 62/244 |
| 4,982,583 | * | 1/1991 | Matsuda et al. ....................... 62/244 |
| 5,001,905 | * | 3/1991 | Miyazaki .............................. 62/244 |
| 5,005,372 | * | 4/1991 | King ..................................... 62/244 |
| 5,220,808 | * | 6/1993 | Mayer .................................... 62/244 |
| 5,605,055 | * | 2/1997 | Salgado ................................. 62/244 |

FOREIGN PATENT DOCUMENTS 44 35 292 * 4/1996 (DE) .
0 257 569 * 3/1988 (EP) .

* cited by examiner

*Primary Examiner*—Michael Powell Buiz
*Assistant Examiner*—Chen-Wen Jiang

(57) ABSTRACT

The present invention provides for an air conditioning unit for mounting within or on the roof of a vehicle which has a passenger compartment and air delivery ducts, the unit being adapted for conditioning of air with the passenger compartment of the bus. The unit comprises a casing having a longitudinal axis extending between ends and adapted to be attached to the roof of the vehicle with the longitudinal axis oriented front to back of the vehicle. A condenser section (24) is located centrally of the casing and adjacent the top thereof, the condenser section (24) including air delivery device (48) and at least one condenser coil (40) located adjacent the air delivery device (48). At least one evaporator section (22) is located between the condenser section (24) and a side of the casing and adjacent the bottom of the casing, the evaporator section (22) including an evaporator section air delivery device (30) and an evaporator coil (26), the air delivery device (30) having an air inlet for drawing in air from the passenger compartment and an outlet for discharging the air through the evaporator coil and then returning the conditioned air to the passenger compartment.

3 Claims, 2 Drawing Sheets

AIR CONDITIONER UNIT FOR MOUNTING WITHIN OR ON THE ROOF OF A VEHICLE

FIELD OF THE INVENTION

The present invention relates in general to air conditioner units, and more specifically to an air conditioner unit suitable for mounting within or on the roof of a vehicle, such as a bus.

BACKGROUND OF THE INVENTION

Vehicles such as buses are typically provided with air conditioning units for conditioning the air within the interior of the bus. These air conditioning units may include both heating and cooling functions and are generally mounted on the roof of the bus with inlets and outlets provided in communication with the interior of the bus for conditioning the air within the interior of the bus.

A number of roof mounted air conditioner units have been developed which incorporate both the evaporator and condenser functions in a single package and include evaporator coils at the suction side of air flow passage.

For example, U.S. Pat. No. 5,605,055 Roof Mounted Air Conditioner describes units which incorporate both of the evaporator and condenser functions in a single package wherein pairs of condenser and evaporator coils are located outboard of the longitudinal axis. Other examples of such units are shown in U.S. Pat. Nos. 4,926,655 and 5,005,372 among others.

These units suffer some disadvantages, in particular, water which may condense on the surface of the coils under the negative static pressure. This condensation of liquid must be evacuated from the air conditioner unit or else it may leak into the interior of the bus.

SUMMARY OF THE INVENTION

The present invention provides for an air conditioner which includes both the evaporator and condenser functions in a single package wherein evaporator coils are mounted against evaporator air flow on a discharge side of evaporator section air delivery means.

The present invention provides for an air conditioning unit for mounting within the roof of a vehicle which has a passenger compartment and air delivery ducts, the unit being adapted for conditioning of air with the passenger compartment of the bus. The unit comprises a casing having a longitudinal axis extending between ends and adapted to be attached to the roof of the vehicle with the longitudinal axis oriented front to back of the vehicle. A condenser section is located centrally of the casing and adjacent the top thereof, the condenser section including air delivery means and at least one condenser coil located adjacent the air delivery means. At least one evaporator section is located between the condenser section and a side of the casing and adjacent the bottom of the casing, the evaporator section including an evaporator section air delivery means and an evaporator coil, the air delivery means having an air inlet for drawing in air from the passenger compartment and an outlet for discharging the air through the evaporator coil and then returning the conditioned air to the passenger compartment.

In an aspect of the invention, there is provided an air conditioning unit suitable for mounting within the roof of a vehicle which has a passenger compartment and air delivery ducts and is adapted for delivery of conditioned air from the air conditioner unit into the passenger compartment of the bus. The air conditioner unit includes a casing having a longitudinal axis extending between the ends and is adapted to be attached to the roof structure of the vehicle with the longitudinal axis of the casing oriented front to back on the vehicle. The air conditioner unit has a condenser section having longitudinal centrally located openings for condenser air flow, air flow delivery means attached to the openings and elongated condenser coils are horizontally located outboard from the longitudinal opening and are attached to the condenser openings. Longitudinal openings are provided in the bottom of the casing extending parallel to the longitudinal axis which are located outboard from the condenser section. The openings are equally spaced from the first and second sides of the casing. First and second elongated evaporator coils are oriented vertically, but at a slight angle, outboard from the longitudinal opening. Between the openings and between the evaporator coils are evaporator air flow delivery means. The air flow passages for both the evaporator coils are located between each of the pairs of condenser coils and evaporator air delivery means.

BRIEF DESCRIPTION OF THE DRAWINGS

Preferred embodiments of the present invention are illustrated in the drawings in which.

DETAILED DESCRIPTION OF THE PREFERRED EMBODIMENTS

Figure 1:
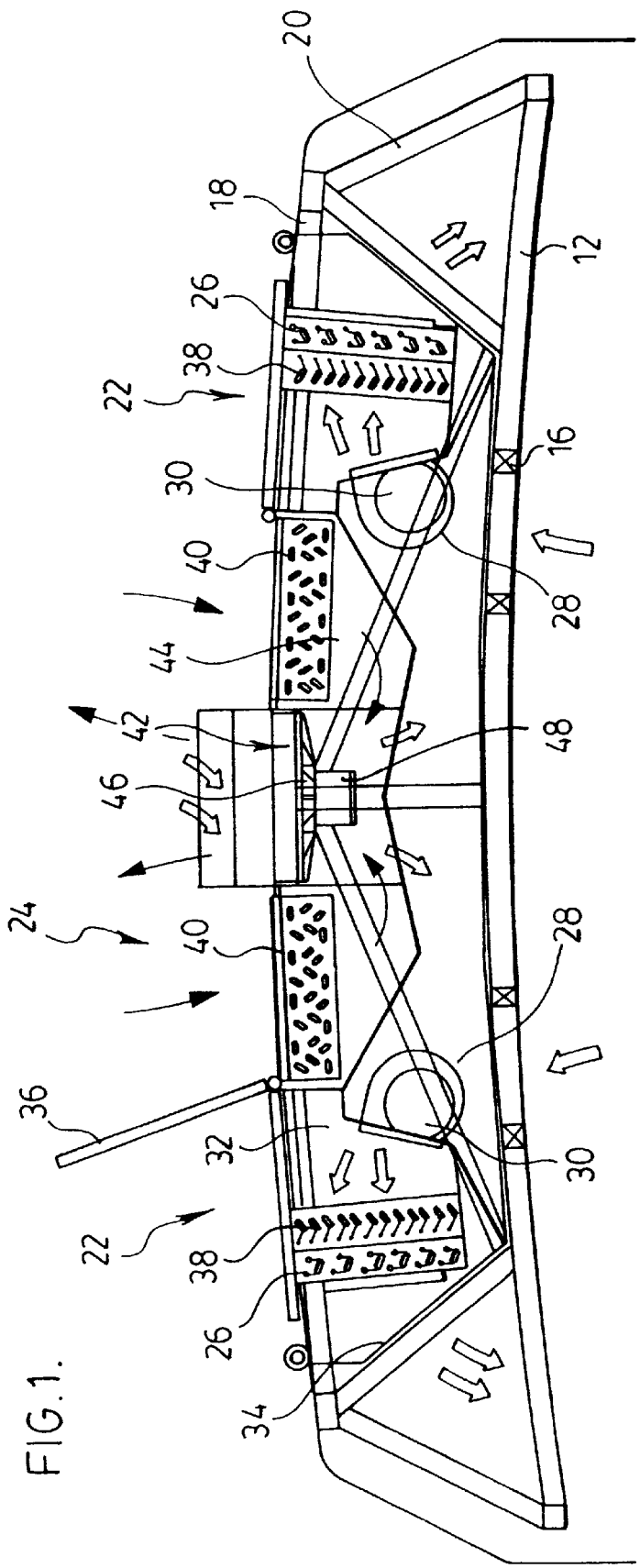
FIG. 1 is a side elevation view in cross-section of a first embodiment of a bus air conditioner of the present invention for mounting within the roof of a bus.
Figure 2:
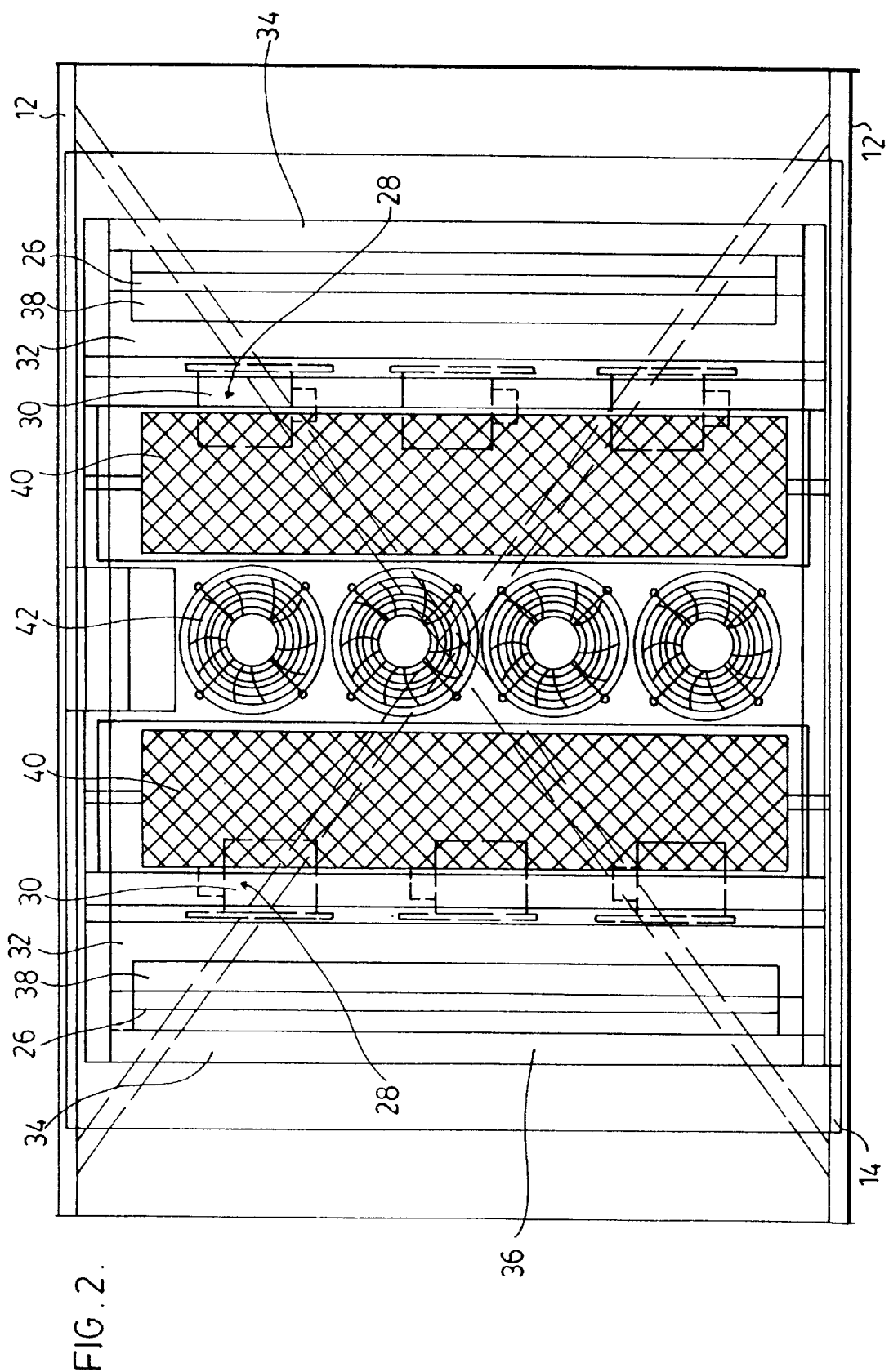
FIG. 2 is a top plan view of the bus air conditioning unit of FIG. 1.

The present invention is directed to a bus air conditioning unit for mounting either on the roof of a bus, or within the roof of a bus. A first embodiment of the bus air conditioning unit of the present invention is illustrated in FIGS. 1 and 2. This air conditioning unit is designed for mounting within the roof structure of a bus. A bus roof structure generally includes a plurality of curved or bowed struts or beams 12 and 18 traversing the bus. The struts or beams 12 and 18 are generally spaced about 50 inches apart from the front to the back of the bus. These beams are supported by a number of horizontal structural members 16 extending between the curved beams 12. The bus air conditioning unit illustrated in FIGS. 1 and 2 has a open structure with a casing 10 sized to fit within and having a lip edge 14 supported by adjacent struts or beams 12 or 18 of the bus roof. The bus roof structure comprises support members 12 which traverse the width of the bus. Support members 12 are tied together by scissor shaped struts 14 and horizontally extending members 16. The roof structure is also provided with top transverse members 18, spaced from the bottom members 12 by struts 20.

The refrigerant components of the air conditioner include evaporator sections 22 and condenser sections 24 mounted upon the frame. Each of the evaporator sections 22 are provided with evaporator coils 26 oriented vertically but at a slight angle and an air delivery assembly 28 for drawing air from the passenger compartment, or interior, of the bus and passing it through the evaporator coil and then returning it to the bus interior. The air delivery assembly includes a suitable blower means such as a centrifugal blower 30, the inlet of which is in communication with the interior of the bus to draw air in from the interior of the bus to allow it to pass through the evaporator coils 26. The outlet of the centrifugal blower 30 is directed into an air plenum 32 within which the evaporator coils 26 are contained. As the air passes through the evaporator coils 26 it is conditioned and then exits from the air plenum 32 through suitable vents 34 and returns to the interior of the bus. The evaporator section 22 is closed off at its top surface by a hinged access door 36 which allows for ease of access to the evaporator section for maintenance and repair. For use in colder climates, the evaporator section 22 may be provided with heater coils 38 for heating of the air for the passenger compartment of the bus.

Condenser section 24 has condenser coils 40 and is provided with a plurality of air delivery assemblies 42 in communication with the condenser coils 40 by means of an air plenum 44. Condenser air delivery assemblies 42 are preferably axial-flow fans having fan blades 46 and driven by suitable electric motors 48. The axial-flow fans 42 push air out of the air plenum 44 and thus draw the air into the plenum through the condenser coils 40.

The embodiment of the invention illustrated in the figures is for mounting within the roof structure of a bus. The present invention is also suitable for units which mount on the surface of the roof. Such units will generally have a suitable frame for being supported by the roof structure of the bus and be in enclosed by a suitable, aesthetically pleasing, structure. Such air conditioning unit will be provided with a evaporator section and condenser section similar to that described above.

By providing the evaporator section of the air conditioning unit of the present invention in the configuration as described above, wherein the air delivery means pushes the air through the evaporator coils rather than drawing it through the coils as in the prior art increased efficiency and additional benefits of the structure of the present invention are achieved. These benefits include easier removal of condensation from the evaporator coils and increased efficiencies of the air conditioning capabilities of the unit. By placing the evaporator coils under the higher pressure of the discharge of the evaporator air delivery assembly condensation of moisture on the evaporator coils is easier to remove and does not require the special structures necessary to remove the condensed liquid as in the prior art.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An air conditioning unit for mounting within or on the roof of a vehicle which has a passenger compartment and air delivery ducts, the unit being adapted for conditioning of air with the passenger compartment of the vehicle, the unit comprising a casing have a longitudinal axis extending between ends and adapted to be attached to the roof of the vehicle with the longitudinal axis oriented front to back of the vehicle, a condenser section located centrally of the casing and adjacent the top thereof, the condenser section including air delivery means and at least one condenser coil located adjacent the air delivery means, at least one evaporator section located between the condenser section and a side of the casing and adjacent the bottom of the casing, the evaporator section including an evaporator section air delivery means and an evaporator coil, the air delivery means having an air inlet for drawing in air from the passenger compartment and an outlet for discharging the air, through the evaporator coil and then returning the conditioned air to the passenger compartment.

2. An air conditioning unit as claimed in claim 1 wherein the evaporator coil is oriented generally vertically at a slight angle from vertical.

3. An air conditioning unit suitable for mounting within the roof of a vehicle which has a passenger compartment and air delivery ducts and is adapted for delivery of conditioned air from the air conditioner unit into the passenger compartment of the vehicle, the air conditioner unit comprising a casing having a longitudinal axis extending between the ends and adapted to be attached to the roof structure of the vehicle with the longitudinal axis of the casing oriented front to back on the vehicle, a condenser section having longitudinal centrally located openings for condenser air flow, air flow delivery means attached to the openings and a pair of elongated condenser coils horizontally located outboard from air flow delivery means and attached to the longitudinal openings, an evaporator section having longitudinal inlets provided in the bottom of the casing extending parallel to the longitudinal axis which are located outboard from the condenser section, the inlets being equally spaced from the first and second sides of the casing, first and second elongated evaporator coils oriented vertically, but at a slight angle, outboard from the longitudinal inlets, evaporator air flow delivery means located between the inlets and the evaporator coils, the air flow passages for both the evaporator coils are located between each of the pairs of condenser coils and evaporator air delivery means.

\* \* \* \* \*